United States Patent Office 3,458,391
Patented July 29, 1969

3,458,391
PLASTIC LAMINATES
Charles Hartley Miller, Jr., Stamford, Conn., assignor to American Cyanamid Company, Stamford, Conn., a corporation of Maine
No Drawing. Continuation-in-part of application Ser. No. 432,880, Feb. 15, 1965. This application June 27, 1966, Ser. No. 560,797
Int. Cl. B32b 27/30, 27/06; D06p 5/00
U.S. Cl. 161—189                                          10 Claims This application is a continuation-in-part of my earlier application having the Ser. No. 432,880, filed Feb. 15, 1965, entitled "Plastic Laminates," now abandoned.

This invention relates to a unitary heat and pressure consolidated weather resistant laminated article which comprises in superimposed relationship (1) a rigidity imparting base member having bonded thereto (2) a protective film of a blend of from about 90% to about 40%, by weight, of a polymer of a monomer selected from the group consisting of methylmethacrylate and ethylmethacrylate and, correspondingly, from about 10% to about 60%, by weight, of a polymer of vinylidene fluoride, wherein said percentages, by weight, are based on the total weight of the blend. Still further, this invention relates to the process of producing a laminate of the class described.

One of the objects of the present invention is to produce a heat and pressure consolidated multilayer laminate which has surprisingly improved and unexpectedly beneficial properties which lend themselves to the use of such a laminate for outdoor purposes as well as indoor applications. A further object of the present invention is to produce a laminated structure which has excellent durability, long term craze resistance and which can be easily and inexpensively manufactured. A further object of the present invention is to produce a laminated composite structure which is extremely resistant to weathering. A still further object of the present invention is to produce a laminated structure which does not require an adhesive resin binder to hold the top film or protective layer to the substrate to which it is laminated. These and other objects of the present invention will be discussed in greater detail hereinbelow.

The composition of matter which is used to make the surface film used in the laminates of the present invention is described in detail in the copending United States application Ser. No. 432,839, filed Feb. 15, 1965, in the name of Joseph Michael Schmitt, entitled "Compositions," now abandoned.

In preparing the laminates of the present invention, some of the compositions of the Schmitt application are prepared by blending a polymer of a monomer such as methylmethacrylate or ethylmethacrylate with polyvinylidene fluoride in such a manner so as to make blends containing from about 90% to about 40%, by weight, of a polymer of methylmethacrylate or a polymer of ethylmethacrylate with, correspondingly, from about 10% to about 60%, by weight, of a polymer of a vinylidene fluoride. Preferably, one may use between about 65% and 50%, by weight, of the methacrylate polymer and, correspondingly, from about 35% to about 50%, by weight, of the polymer of vinylidene fluoride. In all instances, these percentages, by weight, will total 100%, and the percentages, by weight, are based on the total weight of the methacrylate polymer and the vinylidene fluoride polymer. Although each of the methylmethacrylate and the ethylmethacrylate polymers may be used separately with the polymer of vinylidene fluoride, they may also be used in admixture with one another, in which event the total percentages of the methacrylate polymers will still remain within the framework of the proportions set forth hereinabove.

The polymer of vinylidene fluoride is an old and well-known material which is disclosed in the United States Patent 2,435,537. This polymer material is commercially available from a plurality of sources, and further discussion of the polymer preparation is not deemed to be necessary. By the same token, the polymethylmethacrylate component and the polyethylmethacrylate component are each separately well-known in the art and the former, at least is commercially available from a plurality of sources.

The substrate to which the film of the polymeric blend is to be applied may be any one of a substantial plurality of rigidity imparting base members. Among such base members are plywood, aluminum sheet, masonite, pressed wood, flakeboard, cement asbestos board or laminated structures prepared by superimposing a plurality of thermosetting resin impregnated sheets of kraft paper and heat and pressure consolidating the same prior to or simultaneously with the superimposition of the film of a polymer blend on such a laminated assembly. Additionally, one may make use of any one of a number of thermoplastic or thermosetting resinous materials as the substrate member such as sheets of filled or unfilled polyvinyl chloride or polymethylmethacrylate or polystyrene sheet as a core. It will frequently be desirable to impart a decorative effect to the ultimate laminated structure in which event there is utilized a decorative sheet which is positioned between the rigidity imparting base member and the film of the polymeric blend. This decorative sheet may be a solid colored sheet of a suitable paper having, for instance, a pastel color imparted thereto or the decorative sheet may have a printed design or decorative effect or a message applied to the upper surface of said decorative sheet so as to make the same visible through the protective film. Wood prints such as prints of mahogany, pine, maple, walnut, and the like, may be used where the ultimate laminated structure is to be used as a building product for either indoor or outdoor use.

One of the suprising and unexpectedly beneficial effects which is achieved by the use of the protective film in the laminate of the present invention resides in the fact that no adhesive is required to bond together the protective film to the rigidity imparting base member, and when said protective film is secured to the substrate members, surface cracking and/or crazing is, for all practical purposes, eliminated. On the other hand, if the amount of polyvinylidene fluoride incorporated in the blend is significantly above 60%, such as 70%, or higher, bonding to the substrate, particularly in those instances in which a decorative print sheet is used, which print sheet is impregnated with a melamine-formaldehyde resin, cannot successfully be achieved and an adhesive material is then required. As a result of using the protective film in the laminate of the present invention, there is imparted a strong resistance to surface cracking which is due, at least in part, to the increased tensile elongation of the overlay film of the blend of polymethylmethacrylate and/or polyethylmethacrylate with polyvinylidene fluoride. Previously, cracking or crazing have almost always arisen with conventional rigid surface layers, particularly under the influence of thermal variations, moisture variations, and the like, in such environments which occur as a result of prolonged weathering of such structures in outdoor use. It is possible by preparing the laminates of the present invention to obviate such difficulties.

Prior to the instant discovery, considerable research effort has been expended over recent years especially with the increased use of plastic materials in building construction in an effort to discover an optimum laminate structure which fulfills the requirements of (1) a high degree of transparency in the hard protective surface film; (2) capacity of the laminate to withstand the rigors of outdoor exposure to heat, moisture, cold and other degrading influences; (3) the capacity to resist cracking or crazing partly due to the aforesaid environmental conditions and hydrolytic effects but also to attack by organic solvents in horizontal applications; (4) sufficient capacity for varying degrees of linear expansion among the component layers, many of which have varying coefficients of linear expansion, without cracking or crazing; (5) adherability of the several laminate components without need of the addition of an adhesive.

Up to the time of the present finding, however, no satisfactory structure which met all of the above criteria was found, although innumerable materials were prepared and tested. However, with the preparation of the product of the present invention, there appears a laminate structure which not only meets, but exceeds the above demands for a suitable laminate. One very practical and commercial end use of such a discovery exists in the manufacture of a weather resistant and relatively inexpensive siding or house sheathing material. Many other uses such as exterior furniture and decorative laminates employed therein would, of course, be logical products derived therefrom.

Consequently, in accordance with the practice of the present invention, the above objects are obtained by the manufacture of a unitary heat- and pressure-consolidated weather resistant decorative laminate which comprises in its broadest manifestation a top film of the above-mentioned blend and a substrate which may be one or more layers of various decorative and/or non-decorative materials. One selected and preferred embodiment of the present invention comprises a rigidity-imparting base member such as a phenolic core composed of a plurality of paper sheets impregnated by a phenol formaldehyde resin supporting a decorative print sheet which, during the course of manufacture, becomes bonded to both the base or core layer on the bottom and the protective overlay film on the top, and a substantially transparent top film of an adherable blend of polymeric methylmethacrylate and polymeric vinylidene fluoride. For the purposes of manufacturing operations, the blend ratio of the two resins in the top film is preferably from about 65% to 50% of the methacrylate polymer to from about 35% to 50% of the vinylidene fluoride polymer. The particular preferred embodiment will have a transparent top through which is plainly visible the underlying decorative print sheet. Nevertheless, it is within the concept of the present invention that the print sheet member may be eliminated and the substrate be one that has its own inherent design such as a natural wood grain which is carried through to the viewer. In still another variation falling within the concept, a pigment such as $TiO_2$ may be admixed with the protective top film so as to give rise to a pigmented article having all of the other desirable attributes of the laminate. It now, of course, becomes obvious to those skilled in the art that various other types of colorants and dye stuffs may be introduced into the top film without detracting from the properties of the said novel film.

With regard to the composition of the blend of polymers in the top film, the polymeric vinylidene fluoride is preferably utilized as a pure homopolymer or a copolymer containing tolerable limits up to about 5% of a second monomer which may be present therein as an impurity, so long as the chemical or physical properties of the polymer per se are not materially altered. Moreover, it will be within the concept of the invention to employ coplymers or terpolymers of the material in lieu of the homopolymer. As regards the polymer of methylmethacrylate and/or ethylmethacrylate, these components can be either a homopolymer or a copolymer thereof with up to about 20%, by weight, of comonomer which is copolymerizable therewith such as methyl acrylate, ethyl acrylate, and the like. Any known procedure may be utilized to blend the components of the instant binary composition with one another. One such technique is to utilize a rubber mill, or a Banbury mixer or the components may be fed to an extruder and blended during the extrusion process. The said components are generally blended in solid form, but they may be blended in solution or as a suspension without materially affecting the properties of the blended product. The blended product may be compounded or mixed with certain other additives such as binders, ultraviolet light absorbers, inhibitors, lubricants, organic or inorganic dyes and/or pigments, and the like, without substantially distracting from any of the novel properties of the laminate structure.

The primary purpose of the substrate member of my structure is to supply rigidity and where the top layer is transparent, to provide a protective effect. Such conventional base materials as chip board, plywood, cement asbestos board, fiber board, resin impregnated paper, and the like, may be used.

In another variation of the structures of the invention as shown in the selected embodiments presented below, certain known thermoplastic or thermosetting resins may be employed as the substrate member with the particularly desirable effect of still further reducing the differential in linear coefficients of expansion in those areas where extreme temperature variations are encountered. As examples of this, one may utilize a sheet of polyvinyl chloride, or a sheet of clear polystyrene or a polymeric methylmethacrylate resin as a base or core. It is, of course, to be understood that the total laminate structure of the invention may itself be affixed by various means such as nailing or cementing of the laminate to an exterior wall or table top, as the case may be.

Concerning those embodiments of the invention wherein it is desired to insert a print sheet member between the base or core member and the top protective overlay film, it is contemplated that conventional print sheet members may be employed, such as high grade absorbent α-cellulose paper which has been marked with a design or dyed or pigmented to impart a solid color thereto. Likewise, a melamine-formaldehyde resin impregnated sheet having imprinted thereon a decorative image may be employed as shown in another one of our selected embodiments. A still further print sheet material is comprised of fibrillated wet-spun filaments of a polymer of acrylonitrile. These acrylic fiber sheets are well known in the paper making art, e.g., U.S. Patents 2,810,646 and 2,847,455. The materials available for use as print sheets are kraft paper, cotton fabrics, linen fabrics, glass fiber fabric, polyester resin fibers, nylon, and the like. Printed designs having an unlimited range or form of artistic effect may be employed so long as the inks or other coloring matter contained therein are non-bleeding in the curable resinous compositions with which the sheet is subsequently saturated and/or coated. It should be noted that these inks or colorants will preferably be resistant to fading under outdoor conditions. It is possible to provide an additional measure of protection by incorporating in the top layer a known ultraviolet light absorber. In addition, the filaments making up the print sheets may contain minor amounts of such materials as are normally present in textile fibers, e.g., delusterants, antistatic agents, and the like, while the print sheets themselves also contain minor amounts of any of the softening agents, sizes, coating materials and the like commonly employed in the manufacture of paper.

The print sheet members may be used as such or they may be pre-impregnated with known aminotriazine-aldehyde thermosetting resins. These resins as well as techniques for their preparation are shown, for example, in U.S. Patent Nos. 2,197,357 to Widmer et al. and 2,260,239 to Talbot. These are synthetic resins wherein one or more amino-triazines containing at least two amidogen groups, each having at least one aldehyde-reactable hydrogen atom attached to the amidogen nitrogen atom, e.g., melamine, have been reacted with an aldehyde such as formaldehyde, to yield a potentially thermoset rasinous condensate, i.e., one which has been carried to an intermediate stage of condensation whereby it remains as a resinous material soluble or readily dispersible in aqueous systems while also remaining capable of being converted, under suitable conditions of heat and pressure, to a substantially insoluble and infusible form.

Melamine is the preferred aminotriazine reactant for preparing the heat-curable or potentially heat-curable partially polymerized aminotriazine-aldehyde resinous reaction products which are employed to impregnate the print sheet, but other aminotriazines, e.g., mono-, di- and tri-substituted melamines, such as the mono-, di- and trimethylmelamines, and the like; guanamines, such as formoguanamine, acetoguanamine, benzoguanamine, and the like, as well as mixtures of aminotriazines, may also be utilized as reactants. Similarly, formaldehyde, either as such or as an aqueous solution, is the preferred aldehyde reactant, but other aldehydes, e.g., acetaldehyde, propionaldehyde, butyraldehyde, benzaldehyde, and the like, or compounds engendering aldehydes, e.g., paraformaldehyde, hexamethylenetetramine, and the like, may also be employed. The properties desired in the finished product and economic considerations are among the elements which will determine the choice of the particular aminotriazine and aldehyde employed.

The mol ratio of aldehyde to aminotriazine in the resinous reaction product is not critical, and may be within the order of from about 1:1 to about 6:1, respectively, depending on the nature of the starting materials and the characteristics desired in the final product, but it is preferred that the mol ratio of aldehyde to aminotriazine be within the order of from about 1.5:1 to about 3:1, respectively. Thus, the aldehyde and aminotriazine may be heat-reacted at temperatures ranging from about 40° C. to reflux temperature, i.e., about 100° C., for periods of time ranging from about 30 to about 120 minutes, at a pH ranging from about 7 to about 10, preferably in aqueous medium. Any substance yielding an alkaline aqueous solution may be used to effect alkaline reaction conditions, for example, alkali metal or alkaline earth metal oxides, hydroxides or salts with weak acids, e.g., sodium, potassium or calcium hydroxide or sodium or potassium carbonate. Mono-, di- or triamines, e.g., triethanolamine, alkaline polyamines or polyalkaline polyamines, e.g., 3,3′-iminobispropylamine, and the like, may also be used to effect alkaline reaction conditions. When necessary, acidic substances such as hydrochloric acid, sulfuric acid, phosphoric acid, acetic acid, and the like, or salts thereof may also be employed to regulate the pH.

The general conditions for impregnation of print sheets applicable to those situations in which an impregnated print sheet is employed is more elaborately described in the copending U.S. Application Serial No. 392,275, filed Aug. 26, 1964 now abandoned to Kamal et al. Since this aspect does not comprise the essence of applicant's invention, it will not be described in elaborate detail since it is well known to those versed in the art.

If a substrate material such as a thermoplastic foam, which is sensitive to extreme temperature or pressures is selected, a suitable adhesive admixture such as that particularly described in the aforementioned application of Kamal et al. is added as a bond between the top protective film and the substrate members. It must be borne in mind, however, that when such a peculiar situation arises, the laminating conditions of temperature and pressure must be suitably lower. In general, however, conventional laminating techniques employed in preparing the laminates of the present invention, e.g., the top film and print sheet, if one is used, are first assembled with the base member and inserted in a laminating press between laminating press plates, such as stainless steel press plates which may have finishes ranging from a mirror polish to a matt or textured surface. Such materials are brought together as a single assembly or as a multiple assembly of two or more such single assemblies. The assembly members are then consolidated by means of heat and pressure into a unitary decorative structure. Besides laminates having only one decorative surface, it is within the metes and bounds of the invention to have a balanced laminate wherein a mirror image of the decorative assembly is bonded to each side of the base or core member so as to give a decorative member having two faces capable of use.

Laminating temperatures ranging from about 135° C. to about 160° C. and preferably from about 140° C. to about 150° C. are employed in normal operation. Pressures ranging from about 150 p.s.i. to about 1500 p.s.i. are conventionally employed. In general, the particular pressures employed will depend in large measure upon the nature of the substrate and the dimension of the thin protective top film of polymer blend. In those cases where relatively thin overlay members are involved in the nature of 1 to 8 mils in thickness, less pressure is required to bond the members together while in the case of relatively thick top films of the magnitude of 20 mils in thickness, relatively high temperatures and pressures are required. The time required to effect a good bond of the materials when employing temperatures and pressures within the above stated ranges will generally be in the nature of about 15 to 45 minutes. The resulting laminate structure is generally permitted to cool to about room temperature before being taken out of the press.

It is also feasible to use much shorter times than 15 minutes to laminate the top film to the substrate, for example, if the latter is a thermoplastic composition which does not require curing. In such instances, rapid continuous laminating techniques, as are known in the laminating art, may be employed.

As can be readily perceived from the foregoing description, the preferred mode of practice of the invention involving the formation of laminate structures particularly useful on vertical surfaces permits an adhesive free thin laminate about 1 to 8 mils to be formed. This particular structure has a great advantage over the conventional polyvinyl fluoride or polymethylmethacrylate type currently in use which, in the case of the former, requires a binder adhesive to make it adhere to the print sheet, or in the case of the latter, tends to crack or craze upon prolonged exposure to weathering.

In order that those skilled in the art may more fully understand the inventive concept presented herein, several concrete embodiments of the preferred mode and materials of my invention are set forth in the following examples. It must be remembered that these examples are set forth primarily for illustration and should not be considered for expressed limitations binding on the several claims. All parts and percentages are expressed by weight unless otherwise designated in the specific example.

EXAMPLE 1

A 2–3 mil film of a blend of 35% polyvinylidene fluoride and 65% polymethylmethacrylate was laminated directly to a melamine-formaldehyde impregnated print sheet and a standard phenolic core of phenol formaldehyde impregnated kraft paper. No adhesive was necessary.

Lamination was at 160° C., 800 p.s.i. for 30 minutes. The finished laminate was hard and glossy and was unaffected by exposure to $2\beta$ alcohol or boiling water.

Samples of this laminate have been placed on weatherometric and outdoor exposure. There have been no changes after 10,000 hours. Tests are continuing.

EXAMPLE 2

A 2–3 mil film of a blend of 65% polymethylmethacrylate and 35% polyvinylidene fluoride was laminated to a polyacrylonitrile fibrillated fiber print sheet and a polyvinyl chloride base of substrate. The assembly was pressed at about 140° C. at 200–250 p.s.i. for 20 minutes.

A hard, glossy laminate was obtained.

EXAMPLE 3

A blend of 65% polymethylmethacrylate and 35% polyvinylidene fluoride was prepared on a two roll rubber mill at 176° C. for 10 minutes. This blend was then injection molded into a 2" x 4" plaque which was further pressed to give an 8" x 8" film of about 20 mil thickness.

A simulated wood print melamine-formaldehyde impregnated print sheet was coated with an adhesive comprising 100 parts of a terpolymer of methylmethacrylate, ethyl acrylate and methacrylic acid in an 80/10/10 weight ratio, and 30 parts of the diepoxide represented by the structure:

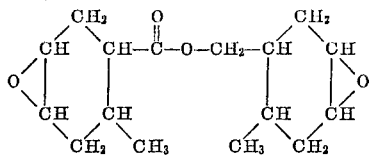

The paper and resin were advanced 8 minutes at 130° C. in an oven. The top overlay film of the aforesaid polymer blend was pressed onto the acrylic terpolymer and print sheet and five sheets of phenolic impregnated kraft paper at 165° C. for 20 minutes at 1100 p.s.i. The finished laminate was hard and glossy and did not visibly craze upon exposure to $2\beta$ alcohol.

EXAMPLE 4

A 2–3 mil film of a blend of 65% polymethylmethacrylate and 35% polyvinylidene fluoride was laminated to a melamine-formaldehyde impregnated print sheet and a phenolic core. For consolidation of the top film, print sheet and substrate, a temperature of between 150 and 155° C. and a presure of between 1000 and 1200 p.s.i. was used. The laminate was pressed between polished plates for between 20 and 30 minutes.

EXAMPLE 5

A 2–3 mil film of a blend of 90% polymethylmethacrylate and 10% polyvinylidene fluoride was laminated to a print sheet of fibrillated fibrous acrylonitrile paper and a polymethylmethacrylate substrate. Laminating temperatures of 130°–140° C. and pressures of 200–500 p.s.i. were used. The laminate was pressed between polished plates for 15–20 minutes.

EXAMPLE 6

A 1–3 mil film of a blend of 80% polymethylmethacrylate and 20% polyvinylidene fluoride was laminated to a print sheet of fibrous polyacrylonitrile and a substrate of phenolic impregnated kraft paper. Lamination was at 145° C.–155° C. for 20–30 minutets at a pressure of between 600 and 800 p.s.i.

EXAMPLE 7

A laminate was prepared by laminating a film of between 1 and 3 mils of a blend of 65% polymethylmethacrylate and 35% polyvinylidene fluoride to a plywood substrate. Laminating conditions were 140°–145° C., 200–400 p.s.i. for 30 minutes. Dual plates were used for the laminating and the finished laminate retained the wood appearance.

EXAMPLE 8

A laminate was made similar to Example 7, but the substrate was a particle board, and the polymer blend was pigmented.

EXAMPLE 9

A 1–3 mil film was made from a blend of 80% polymethylmethacrylate and 20% polyvinylidene fluoride. This film was consolidated into a laminate with a plasticized polyvinyl chloride print sheet and a polyvinyl chloride substrate. Lamination conditions were at a temperature of 140° C., a pressure of 200–300 p.s.i. for 20–25 minutes.

EXAMPLE 10

A 2–3 mil film of a pigmented blend of 65% polymethylmethacrylate and 35% polyvinylidene fluoride was laminated to a melamine-formaldehyde print sheet and a cement asbestos board substrate. To improve the adhesion between the melamine-formaldehyde print sheet and the substrate, a kraft paper highly saturated with a phenolic resin was used as an adhesive sheet. Laminating conditions were 145°–150° C., temperature and a pressure of 1000–1100 p.s.i. Polished plates were used and the heat and pressure were applied for 25–30 minutes.

EXAMPLE 11

A blend of 65% polymethylmethacrylate and 35% polyvinylidene fluoride was pigmented by milling with titanium dioxide and extruded to yield an opaque film. This film, which was 1–3 mils thick, was laminated to plywood at a temperature of 160° C. and at a pressure of between 600–800 p.s.i. for 20 minutes.

EXAMPLE 12

A film prepared from a blend of 65% of a 90/5/5 methylmethacrylate/ethyl acrylate/methacrylic acid and 35% polyvinylidene fluoride was laminated onto a piece of aluminum which has been degreased and washed with chromic acid solution. Lamination was at 160° C., 1000 p.s.i. for 15–20 minutes. Good adhesion and clarity were obtained.

EXAMPLE 13

A 2 mil pigmented film of a blend of 65% polymethylmethacrylate and 35% polyvinylidene fluoride was pressed onto a 1/8" x 7" x 7" piece of Masonite. Lamination was at 160° C., 250 p.s.i. for 20 minutes. The finished laminate was hard and glossy. The bond between the top film and substrate was very good and the top film removed pieces of the substrate as well when peeling was attempted.

EXAMPLE 14

A 2–3 mil film of a blend of 50% polyvinylidene fluoride and 50% polymethylmethacrylate was laminated to a melamine-formaldehyde print sheet, high flow phenolic sheet and a flakeboard or chipboard substrate having a 3–5% binder of a melamine-formaldehyde resin.

A phenolic sheet was put on the back of the flakeboard as a balance sheet.

Lamination was effected at 145° C.–150° C. and 300–500 p.s.i. for 25–30 minutes.

EXAMPLE 15

A laminate is prepared using a 2–3 mil weatherable top film made from a blend of 55% polyethylmethacrylate and 45% polyvinylidene fluoride. The top film was laminated to a melamine-formaldehyde impregnated print sheet and a phenolic core made from 5 sheets of phenolic impregnated kraft paper. Lamination was accomplished at a temperature of 150° C., 1000 p.s.i. for 20 minutes. No external adhesives were needed and a hard, glossy laminate was obtained.

EXAMPLE 16

A 2–3 mil film made from a blend of 85% polymethylmethacrylate and 15% polyvinylidene fluoride was laminated to a 100 mil blue colored sheet of an acrylonitrile-butadiene-styrene terpolymer. No external adhesives were needed as good bonding was achieved by pressing at 150° C., 200 p.s.i. for five minutes. The laminate obtained was hard and glossy and samples were tested very favorably in a weatherometer as well as in natural outdoor exposure.

EXAMPLE 17

A 2–3 mil pigmented film prepared from a blend of 85% polymethylmethacrylate and 15% polyvinyidene fluoride was laminated to a sheet as in Example 16. Good bonding was achieved.

EXAMPLE 18

A blend of 45 parts polyvinylidene fluoride and 55 parts of polymethylmethacrylate is prepared on a two roll rubber mill at 178° C. To this blend is added 1.0 parts of the ultra-violet light absorber 2(2'-hydroxy-5'-methylphenyl)benzatriazole. This blend was then blow extruded into a thin film with the use of a Killion extruder.

The film so prepared was laminated to a ⅛-inch sheet of transparent polyvinylchloride at a laminating temperature of 125–130° C. and under a pressure of 100–200 p.s.i., for a laminating period of 15 minutes. A tight firm body was hence attained without recourse to the use of an adhesive.

Samples of the laminate were subjected for exposure testing and evaluation in the Fluorescent Weather-o-meter. A comparison of the color change data obtained on sheet polyvinyl chloride as contrasted with the same sheet laminated with the polyblend illustrated above prepared is seen in the following tabulation of color change (E) plotted against hours of exposure:

TABLE

| Sample | Exposure time (hrs.) | E values |
|---|---|---|
| Sheet of polyvinylchloride without polyblend overlay. | 1,000<br>2,000<br>3,000<br>4,000 | 29.7<br>47.7<br>Brown<br>Black |
| Sheet of polyvinylchloride with polyblend overlay. | 1,000<br>2,000<br>3,000<br>4,000 | 6.3<br>9.7<br>12.4<br>15.7 |

As can be seen from the above-tabulated data, there is an unexpected improvement in the weatherability of the polyvinyl chloride-polyblend laminate containing the ultra-violet light absorber as contrasted with the sheet of polyvinyl chloride which does not have the protective overlay of the invention.

We claim:
1. A unitary heat and pressure consolidated weather resistant laminated article which comprises in superimposed relationship (1) a rigidity imparting base member having bonded thereto (2) a protective film of a blend of from about 90% to about 40%, by weight, of a polymer of a monomer selected from the group consisting of methylmethacrylate and ethylmethacrylate and, correspondingly, from about 10% to about 60%, by weight, of a polymer of vinylidene fluoride, wherein said percentages, by weight, are based on the total weight of the blend.

2. The laminated article according to claim 1 in which the base member is comprised of a plurality of thermosetting resin impregnated sheets laminated together.

3. The laminated article according to claim 1 in which the base member is a thermoplastic filler-free sheet.

4. The laminated article according to claim 1 in which the methacrylate polymer is present in the blend in an amount varying between about 65% and 50% and the polyvinylidene fluoride is present, correspondingly, in an amount varying between about 35% and 50%.

5. The laminated article according to claim 2 in which a decorative sheet is interposed between the base member and the protective film.

6. The laminated article according to claim 5 in which the decorative sheet is a print sheet.

7. The laminated article according to claim 5 in which the base member sheets are impregnated with a thermosetting phenolic resin and the decorative sheet is impregnated with a melamine resin.

8. The laminated article according to claim 4 in which a decorative sheet is interposed between the base member and the protective film.

9. The laminated article according to claim 8 in which the decorative sheet is a printed sheet.

10. The laminated article according to claim 9 in which the base member sheets are impregnated with a thermosetting phenolic resin and the decorative sheet is impregnated with a melamine resin.

References Cited

UNITED STATES PATENTS

| 2,944,927 | 7/1960 | Dosmann | 161—189 X |
|---|---|---|---|
| 3,131,116 | 4/1964 | Pounds | 161—258 |
| 3,218,225 | 11/1965 | Petropoulos | 161—248 |
| 3,253,060 | 5/1966 | Koblitz et al. | 260—900 |
| 3,294,619 | 12/1966 | Noland | 161—250 X |
| 3,313,676 | 4/1967 | Kamal et al. | 161—189 |
| 3,324,069 | 6/1967 | Koblitz et al. | 260—900 X |
| 3,345,248 | 10/1967 | Pounds et al. | 161—248 |
| 3,356,560 | 12/1967 | Callum | 161—413 X |
| 3,369,960 | 2/1968 | Sedlak et al. | 161—248 X |
| 3,403,071 | 9/1968 | Perry et al. | 161—189 |

HAROLD ANSHER, Primary Examiner

U.S. Cl. X.R.

156—306; 161—248, 250, 413; 260—898, 900